United States Patent [19]
Moeglich

[11] 4,172,774
[45] Oct. 30, 1979

[54] METHOD AND APPARATUS FOR LESSENING IONIC DIFFUSION

[75] Inventor: Karl Moeglich, Williamsville, N.Y.

[73] Assignee: Clearwater Systems Inc., Buffalo, N.Y.

[21] Appl. No.: 853,876

[22] Filed: Nov. 22, 1977

Related U.S. Application Data

[63] Continuation of Ser. No. 627,236, Oct. 30, 1975, abandoned.

[51] Int. Cl.² .......................... C02C 5/12; B01D 13/02
[52] U.S. Cl. .................................. 204/151; 204/180 P; 204/252; 204/253; 204/295; 204/296
[58] Field of Search ..................... 204/180 P, 301, 151, 204/252, 253, 295, 296

[56] References Cited
U.S. PATENT DOCUMENTS 3,488,276  1/1970  Tarsey .................................. 204/301

OTHER PUBLICATIONS

Hampel, *Encyclopedia of Electrochemistry*, (1964), pp. 179 and 808-810.

*Primary Examiner*—Arthur C. Prescott
*Attorney, Agent, or Firm*—Raymond F. Kramer

[57] ABSTRACT

A membrane assembly, useful as a membrane in electrodialytic and electrolytic cells, is made by holding together a plurality of thin layers of membrane material under pressure and with boundary layers of liquid covering their major surfaces. Such membrane assemblies allow the passage therethrough of ions when an electric potential difference is impressed across the membrane assembly but effectively bar the passage of water and gases. They also bar or limit ionic and salt mass transfer in the absence of such a potential difference (during non-use of the cell). They make excellent long lasting cell components, capable of being manufactured simply and economically from any of a variety of membrane materials to produce membranes of desired properties.

15 Claims, 10 Drawing Figures

METHOD AND APPARATUS FOR LESSENING IONIC DIFFUSION

This is a continuation, of application Ser. No. 627,236, filed Oct. 30, 1975, now abandoned.

This invention relates to membranes useful in electrodialytic, electrolytic and mixed electrodialytic-electrolytic processes. More particularly, it relates to such membranes made from an assembly of smooth, uniform pieces of membrane material held together over the major areas of their surfaces and having surface layers (boundary layers) of liquid maintained thereon.

In electrodialytic and electrolytic processes it is known to employ membranes separating various components of the cells utilized so as to facilitate separations of components of solutions to be electrodialyzed (including those to be electrounialyzed) and to prevent intermixing of products of the electrolytic processes. For electrodialysis of aqueous solutions such membranes prevent migration of water or other liquid media between cell compartments while allowing ions and electricity to pass through them. In the electrolytic processes they allow ionic flow and current transmission while preventing intermixing of liquids and gases from the different cell compartments. In some instances, the membranes are permselective and allow the flow of only some ions through them, inhibiting transmission of other, larger ions (or sometimes those of different sign). Although membranes of different pore, opening or passageway sizes have been made, often these have had certain disabilities which prevented them from being as effective as desired. For example, they may not have been able to stand up to prolonged use under normal cell conditions or there may have been excessive voltage drops across them. Thus, when, for example, a sufficient thickness of asbestos fibers is pressed together into a sheet or membrane form so that it possesses the desired ion transmitting and water blocking properties, when a potential difference is impressed on it it may be so thick as to cause an undesirable voltage drop. This may also be the case when thicknesses of ordinary asbestos diaphragm material, each of which could transmit ions in aqueous solution in response to a potential difference but would not block the flow of solvent through it alone, are held together to produce a membrane.

It has now been found that by the use of a plurality of membranes of a certain smoothness, held together as described herein and having boundary layers of liquid, usually electrolyte, on their major adjacent surfaces, the passage of solvent molecules, such as water molecules, may be prevented while at the same time various ions can be transmitted through the membrane assemblies and voltage drops across them will be minimized. Still, without the application of a voltage difference diffusion of the liquid and compounds dissolved therein is prevented or substantially slowed, despite concentration gradients across the membrane assemblies.

Prior art patents do not disclose the present invention. Thus, U.S. Pat. Nos. 442,204, 1,082,286 and 2,326,101, although showing plural layers of asbestos or similar material, all differ significantly from the invention and do not provide and maintain the boundary layers of water or electrolyte between the surfaces of the layers. Therefore, the prior art diaphragms do not function as satisfactorily as the present membrane assemblies.

In accordance with the present invention a membrane assembly comprises a plurality of layers of membrane material having adjacent major surfaces with boundary layers of liquid between such surfaces and with the membranes being held together to maintain such boundary layers over the areas of such surfaces. The required boundary layer of liquid may be applied by wetting the surfaces of the membrane materials before they are assembled and pressed together or can be applied later, as by being allowed to enter between the layers of the membrane material from the edges thereof and displacing air on the material. In preferred embodiments of the invention the membranes are composed of thin sheets of uniformly smooth asbestos paper, wetted on the surfaces thereof and held together by a screen framework or ties but membranes of other materials, held together by equivalent means, are also useful. Also within the invention are electrodialytic and electrolytic cells incorporating such membrane assemblies and methods of electrodialyzing and electrolyzing in which they are employed.

The invention will be readily understood by reference to the accompanying drawing, taken in conjunction with the description, in which.

Figure 1:
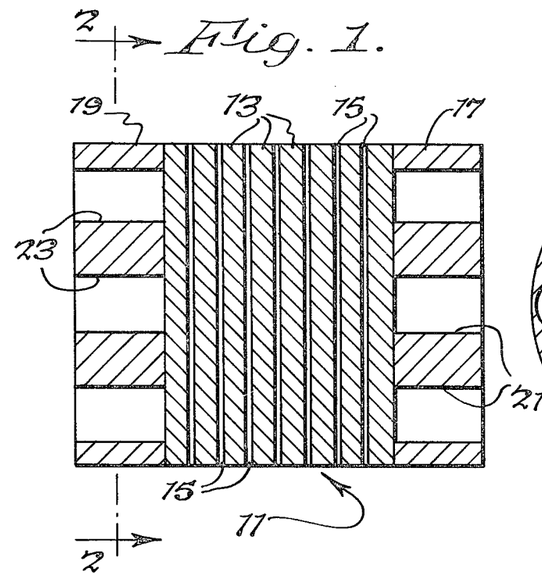
FIG. 1 is a vertical sectional elevational view of a membrane assembly of the present invention along plane 1—1 of FIG. 2, with component membrane parts and boundary layers of liquid being of exaggerated thicknesses for ease of illustration.
Figure 2:
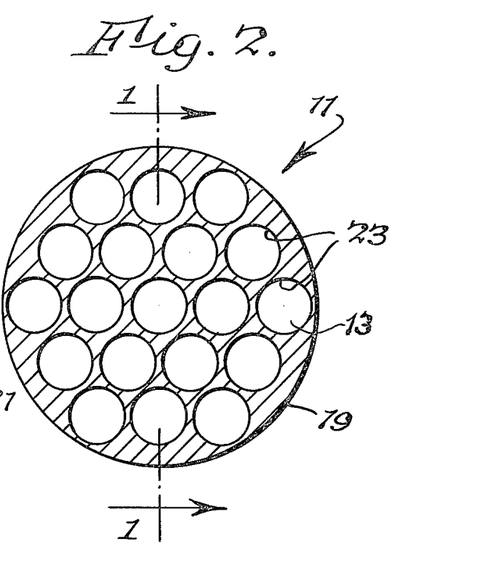
FIG. 2 is a sectional view along plane 2—2 of FIG. 1.
Figure 3:
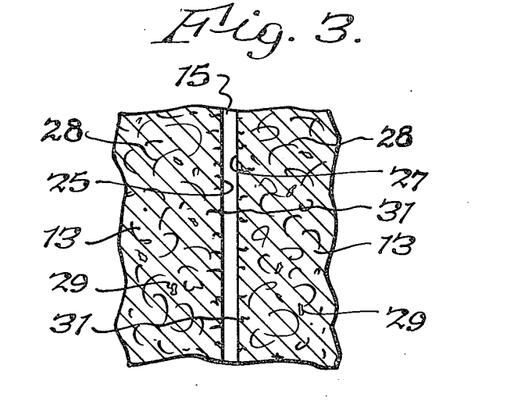
FIG. 3 is an enlarged fragmentary view of an important part of FIG. 2, showing the structure of the membrane elements and the presence of the intermediate boundary layer of liquid therebetween.
Figure 4:
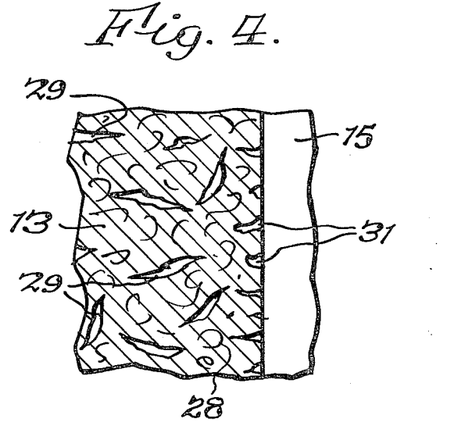
FIG. 4 is a further enlargement of a part of the membrane element of FIG. 3.

In FIG. 1 membrane assembly 11 includes layers of membrane material 13 with liquid boundary layers 15 between them and perforated end members 17 and 19 in disc form, with passages 21 and 23 through them. In FIG. 2 end disc 19 is shown with passageways 23 therein and with membrane 13 in the assembly thereof shown semipermeably blocking the passageways (allowing ions to pass in response to voltage differences but not allowing flow therethrough of larger, polymeric or associated water molecules). In FIG. 3 membrane layers 13 are shown with liquid boundary layer 15 between them and in contact with their smooth surfaces 25 and 27. It is seen that the membranes, as illustrated (as in the cases of asbestos membranes), include pluralities of fibrous or filamentary components 28 pressed together in the form of sheets with smooth surfaces 25 and 27 having minor openings, as at 31, therein, which are of limited equivalent diameters so that the boundary layer of water is maintained and water does not flow into and through the interior of the membrane sheet from the smooth surfaces when an electric potential difference is applied across the membrane assembly, although various ions do. Otherwise, when no electric potential is maintained only a restricted diffusion can take place, if any, and this may be prevented by utilizing a sufficient number of boundary layers. The monomeric water and associated water molecules may penetrate the membrane to some limited (usually minor) extent but do not readily flow through it. In FIG. 4 surface openings 31 and some pores or passageways 29 are illustrated in the body of the membrane. It will be noted that the maximum surface openings are of about half the maximum effective diameters of the internal membrane pores or passageways and both these maxima are less than the thickness of the boundary layer of liquid, which is normally about 250 to 300 microns, at a maximum.

Figure 5:
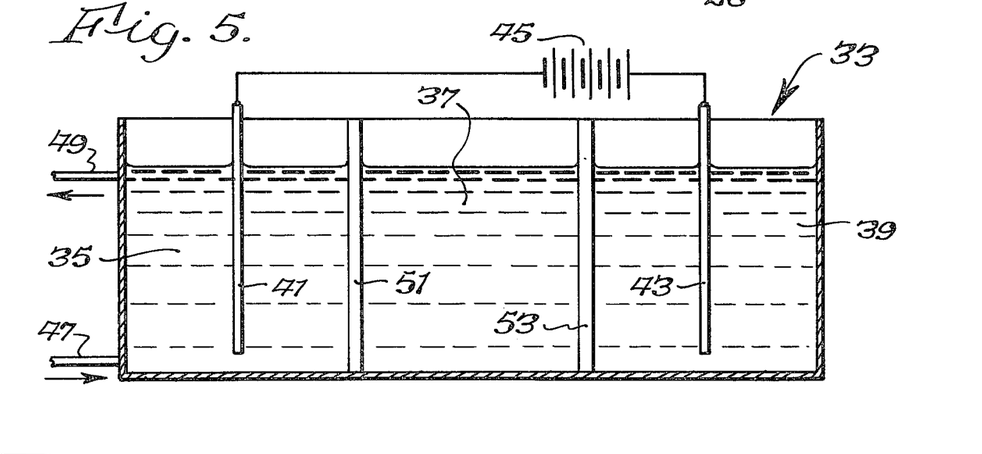
FIG. 5 is a diagrammatic section of a three-compartment electrodialytic cell of the present invention in which the invented membrane assembly is employed.

In FIG. 5 three-compartment electrodialytic cell 33 includes catholyte, intermediate and anolyte compartments 35, 37 and 39, respectively, cathode 41, anode 43, a source of direct current electricity 45 and inlet 47 to and outlet 49 from catholyte compartment 35. Membrane assemblies 51 and 53 separate the catholyte compartment from the intermediate compartment and the intermediate compartment from the anolyte compartment, respectively. In such an electrodialytic cell an aqueous solution containing an anion which it is desired to remove from the solution may be fed to the catholyte compartment and the solution exiting from it will have a lower content of such ion than charged, due to movement of the anion toward anode 43, with the result that compartments 37 and 39 will ultimately be of greater concentrations of the ion than that of the feed to the cathode compartment. When a plurality of anions is present in the feed the more mobile thereof (more readily passed through the present membrane assemblies) may be concentrated in the anolyte and the less mobile may be found to a greater extent in the intermediate (or buffer) compartment. Such effect can also be more selectively obtained by regulating the pore sizes of the membrane assemblies so that the membranes of the assembly between the catholyte and buffer medium are of larger pore size than those of the assembly between the buffer medium and the anolyte compartment. It is an important advantage that, unlike the case with the use of diaphragms, no back flow of liquid or back diffusion of ions takes place.

Figure 6:
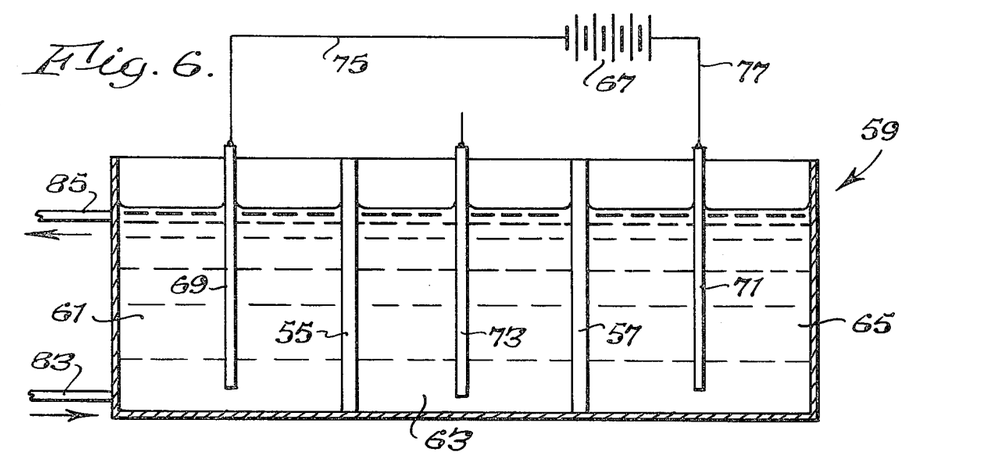
FIG. 6 is a diagrammatic sectional side elevation of a different three-compartment electrodialytic cell of this invention.

In FIG. 6 is shown a three-compartment electrodialytic cell of structure similar to that shown in FIG. 5 but with an intermediate electrode (bipolar in nature) in the "buffer compartment". In FIG. 6 membrane assemblies 55 and 57 divide cell 59 into catholyte, buffer medium and anolyte compartments 61, 63 and 65, respectively and a source of direct current 67 is communicated with cathode 69 and anode 71 by connecting wires 75 and 77. Bipolar electrode 73 is independently maintained at an intermediate voltage by conventional electrical means. Inlet 83 feeds materials to be worked on to the catholyte compartment 61 and outlet 85 allows the removal of liquid from said compartment. Of course, in modifications of the apparatuses of FIG'S. 5 and 6 the feed and discharge lines may be to and from the anolyte compartment and cations from the liquid being processed may be removed from it and may be concentrated in the catholyte. Also, for "true" electrolysis, wherein both anionic and cationic materials are separated from a liquid in which they are present, the structure of FIG. 5 may be modified so as to have the inlet and outlet communicating with the buffer or intermediate compartment rather than with the catholyte (or anolyte) compartment, in which case the cations from the material charged will move into the catholyte, the anions will move into the anolyte and the removed liquid will be depleted in ionic substances. In a further modification of this procedure the material being treated and removed may be recirculated through the same compartment, which may be the intermediate, anolyte or catholyte compartment, depending upon the extent of removal of material(s) desired. Alternatively, batch processes may be employed and may be terminated with sufficient ion removal has been obtained.

Figure 7:
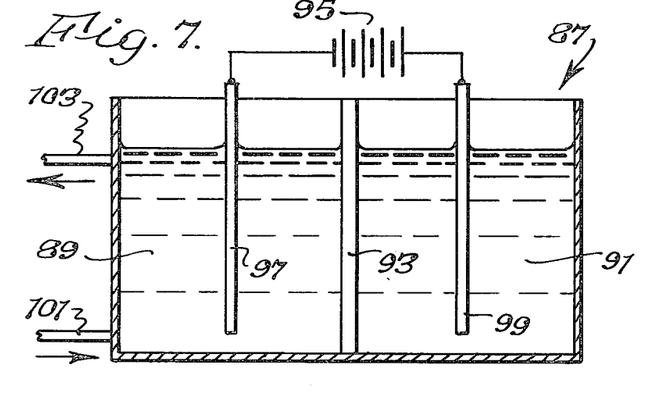
FIG. 7 is a diagrammatic sectional side elevation of a two-compartment electrodialytic or electrolytic cell of this invention.

FIG. 7 illustrates a two-compartment electrolytic or electrodialytic cell 87 having catholyte and anolyte comparments 89 and 91, respectively, with a membrane assembly of this invention 93 separating them, with a source 95 of current (D.C.) communicated to cathode 97 and anode 99 and with inlet and outlet lines 101 and 103 to and from the catholyte compartment respectively.

In FIG'S. 8 and 9 a vertical tubular cell 105 is illustrated, which includes vertical cylindrical wall 107 having a bottom 109 attached to it or otherwise incorporated therewith, a centrally positioned vertical anode 111, a concentric cylindrical cathode 113 and a separating membrane assembly 115 which comprises a vertical perforated cylindrical base 117, a plurality of layers of membranes is rolled form with boundary layers of electrolyte between them, herein designated by the numeral 119 (covering the membrane layers together with the intermediate boundary layers) and an openwork plastic screen 121 wrapped about the membranes and holding them tightly together and against base cylinder 117. A source of direct current 123 supplies the anode and cathode via lines 125 and 127, respectively (shown in FIG. 8). Inlet 129 and outlet 131 are shown communicating with the catholyte compartment for adding to it the cell solution to be worked on and for removing solution from which at least some of the anion content has been removed. As with the various other cells described, by reversal of the anode and cathode or changing of positionings of the inlet and outlet the cells may be modified to remove cation contents from the liquids charged.

Figure 10:
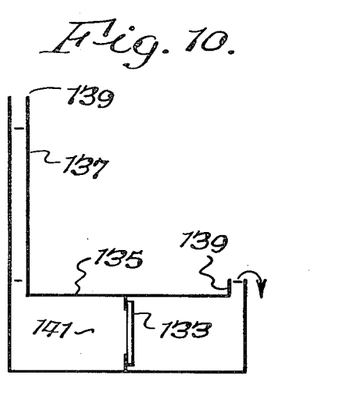
FIG. 10 is a diagrammatic elevation of an apparatus for testing liquid passage rates of membranes and membrane assemblies of this invention.

In FIG. 10 is shown an apparatus for testing the liquid transmission of various membranes and membrane assemblies. A membrane or membrane assembly 133 of known dimensions and cross-sectional area is positioned vertically in tube 135 which is communicated with vertical tubes 137 and 139, through the former of which water 141 is fed and through the latter of which it is removed, by overflowing. The distance between the height of the water in tube 137 and the top of tube 139 respresents the starting head of water exerted against the membrane or membrane assembly. After a period of time the height in tube 137 is again measured and a flow rate of water through the membrane or membrane assembly 133 and the average head imposed on the membrane may be computed. By regulating the starting and finishing heights of the water in tube 137 the average head may be regulated, for example, to be 100 mm. Hg. Thus, the transmission rates of water or other liquid through various membranes and membrane assemblies may be compared and membrane assemblies may be designed for the desired limited rates.

The membrane material employed in making the membrane assemblies of the present invention may be any of a variety of suitable materials which possess the desired small pore or passageway sizes (interstitial passageways between particles, filaments and fibers are included within the term) so that they will readily pass ions to be separated by methods of the invention but will not allow passage of water. Such materials are smooth and of pore sizes in the range of 0.01 to 250 microns in diameter or effective diameter and preferably such pores are in the range of 0.5 to 20 microns, most preferably about 1 to 5 microns. The surfaces of the membranes should be smooth, with the voids thereon normally being of about half the maximum effective diameters of the passageways at the most, e.g., from 0.01 to 125 microns in diameter, preferably 0.5 to 10 microns and most preferably about 0.5 to 2.5 microns. The reason for the upper limit on surface void sizes being less than (and about half) that for internal pores and passageways is that when the two such surface openings are aligned a larger opening can be made and it is important to avoid such opening being so large as to permit additional water in the boundary layer area between the membranes. If larger sized pores than specified are present, either at the membrane surfaces or interiorly thereof, the non-boundary layer water can become mobile and sites of electrolysis can be created adjacent to the boundary layer of water between the membranes, thereby disturbing its conductive effect and increasing the electrical resistance of the membrane assembly. Also, when gases are produced electrolytically adjacent to the boundary layer they can cause further separation of the membranes, promote voltage drop increases across the assembly and prevent transport of the ions (which do not travel through gases).

The thickness of the membrane material utilized depends on its strength and electrical resistance. Thus, it will have to be thick enough to withstand the rigors of handling in the manufacture of the membrane assembly and those of the electrolytic or electrodialytic processes. Similarly, it will have to be thin enough so that the electrical resistance of the assembly will not be excessive. It has been found that, in general, the desired membrane material thickness is in the range of 0.1 to 3 mm., preferably is 0.2 to 2 mm. and most preferably about 0.6 mm., as in the case when asbestos paper membranes are employed.

The surfaces of the membranes are flat (this term includes smooth curves, preferably surfaces of revolution) with adjacent membrane surfaces conforming and with 10 to 90% of the nominal adjacent major surface areas being solid, preferably with 40 to 90% being solid and most preferably with about 70 to 90% being solid (the rest may be surface voids of allowable sizes). At least 90% of the area of the membrane that may be viewed, looking at its major face, is solid at a depth within 120 microns of the surface, preferably at a depth within 10 microns of the surface and most preferably within 2.5 microns thereof.

The number of membranes that may be employed to make the present assemblies may be determined from the strength, ion transmission, electrical conductivity and pore sizes of the assembly. While as few as three membranes are sometimes useful, normally at least four are employed and although the upper limit is theoretically higher, generally no more than 20 and preferably no more than 10 membranes are used in one assembly. Of course, a membrane assembly may comprise a plurality of sub-assemblies, too. Most preferably about four to six membranes are utilized per assembly.

Various membrane materials are employed but the best of these is considered to be asbestos, particularly chrysotile, but other fibrous forms of asbestos are also useful, as are some microcrystalline types too. In addition to asbestos various other fibrous, porous and film materials which allow transport of ions but which have restricted openings therein so as to inhibit water flow through them are also useful, including cellulosic materials, e.g., paper; synthetic organic polymers, e.g., foamed polyurethane, poly-lower olefins such as polyethylene, polytetrafluoroethylene foams; composites of polymers and fibrous fillers, e.g., polymer-impregnated fillers; and ceramics and glasses, e.g., polymer coated glass fibers. Instead of asbestos, other mineral fibers and powders may be employed but usually these, such as finely divided silica and electrolyte-resistant clays, will have binding materials present too, such as the synthetic organic polymers previously mentioned, to give them strength and maintain desired porosities.

The most preferred membrane material, asbestos, is most desirably employed in "paper" form, wherein the fibers are rolled into sheets, e.g., of a thickness of about 0.5 to 0.8 mm., preferably 0.6 mm. Suitable asbestos paper of this type is Grant Wilson commercial grade asbestos paper which has the preferred pore size, surface smoothness, strength and liquid transmission properties previously mentioned.

The suitability of a particular membrane material and the membrane assembly made from it may be verified by checking the rate at which liquid, such as water, under pressure passes through either a single layer of a membrane material or the membrane assembly. An apparatus like that illustrated in FIG. 10 may be employed to test the membranes and normally it will be found that a single layer of membrane will pass 1 or 2 to 100 ml./hr./sq. cm., preferably 5 to 50 ml./hr./sq. cm. and most preferably about 15 to 40 ml/hr./sq. cm. of water at 20° C. under a pressure of 100 mm. Hg. The final membrane assembly will usually allow water to pass through under the same conditions at a rate of 0.1 to 5 ml/hr./sq. cm., preferably 0.2 to 4 ml./hr./sq. cm. and most preferably about 0.3 to 1 ml./hr./sq. cm. The liquid transmission rate for the membrane assembly will usually be less than half the "expected" rate, (which may be obtained by dividing the transmission rate for a single membrane by the number of membranes in the assembly) and will very frequently and very desirably be equal to or less than ¼ such expected rate. Such diminution of liquid transmission through the membrane assembly is indicative of the presence of the desirable boundary layers of liquid (water) on the membranes and indicates that the assembly has been put together correctly. Ideally, there would be no flow at all through the membrane assembly but the small flow noted is due to minor imperfections in the membrane pores, etc.

Between the layers of membrane material, which are held together by pressure in the present membrane assemblies, there is present a boundary layer of liquid, primarily water, in associated or polymer form. The thickness of this layer is about 250–300 microns at a pressure of 12 g./sq. cm. and it conforms to the various voids of the membrane surfaces. The boundary layer is very tightly held to such surfaces and acts as a medium through which ions and electric current may pass readily but through which the larger associated water molecules may not go due to the high energy attraction between the solid surface and the boundary layer of liquid. It is this boundary layer that causes the present membrane assemblies to have their unique and desirable properties. Therefore, it is important that the boundary layer be maintained by holding of the membranes together sufficiently tightly to keep air or liquid from entering between the boundary layer liquid and the membrane surface during use and it is important that the surface characteristics of the membrane be such as to prevent rupture of the boundary layer.

The layers of membrane material may be of the same or different material, as appears best suited for the particular processes in which the membrane assemblies are to be employed, and may be of the same or different porosities and thicknesses, although use of the same materials of the same thickness, porosity and liquid transmission characteristics is preferred.

The membranes are positioned and held with their major faces adjacent to each other (with the boundary layer of liquid between) by any suitable means. Normally it will be highly preferred to utilize a perforated plate, screen, expanded metal or plastic, cloth, porous sheet or other suitable restraining or holding means, of sufficient strength to allow it to hold the membranes sufficiently tightly together to maintain them adjacent each other with only the boundary layer of liquid between them, and of sufficient chemical resistance to allow its employment in designed processes without premature failure. Among the various materials of construction for the compressing member that may be employed are included synthetic organic polymeric materials such as nylons, polytetrafluoroethylenes, polyesters, fiberglass reinforced polyesters, polyethers, phenolic compound-aldehyde condensation products, e.g., phenol formaldehyde, polypropylene, polyethylene and hard synthetic rubbers; natural organic materials such as wood, hard resins, hard natural rubbers; metals and metal alloys, e.g., stainless steels, Monel metal, titanium steel, lead, but only when such metals are also electrodes; equivalent materials and mixtures thereof.

It is desirable that the compressing members apply a force averaging at least 12 g./sq. cm., preferably 12 to 5,000 g./sq. cm. and more preferably 100 to 5,000 g./sq. cm., e.g., 500 to 3,000 g./sq. cm. to the "outside" membranes and that such pressure is applied substantially evenly across the major surfaces of the membrane surfaces, with at least one point of application every 2 square centimeters thereof, preferably every sq. cm. and more preferably every ½ sq. cm. thereof. Pressures over 5,000 g./sq. cm. can be applied but are not usually desired because at such pressure the surface irregularities of the facing membranes (due to the smoothness limits of the forming machine surfaces used to smooth the membranes, about 0.4 microns) may be brought into contact (the boundary layers are diminished when greater forces are applied) with each other, thereby locally affecting the continuity of the boundary layer and diminishing its effect. To allow the passage of liquid through the membrane assembly the compressing members should normally have at least 50% open surface and cross-sectional areas, preferably at least 70% and more preferably at least 90%, e.g., 50-99%, 70-99% and 90-98%. Such areas are calculated on a developed basis when the compressing members or holding members are curved.

In addition to the pressure exerted by the holding member against the major surfaces of the membranes the membranes may be held together, preferably peripherally, by cement, fusion or other adhesive or cohesive mechanism. In some instances, it may be possible to utilize cement or fusion alone, especially if the membrane is previously stretched slightly so that its elasticity or elastic memory, favoring a return to original shape, causes one membrane major surface to press against another (with the boundary layer between). Although cementing or fusion together of the contacting major surfaces of the membrane may be effected across such surfaces, leaving room between most of the surfaces for the boundary layer, when cement or glue is employed it will preferably be at intervals around the peripheries of the membrane.

The membrane assemblies may be employed for dialysis (unialysis, wherein ions of only one charge sign are transported, is included), electrodialysis (again electrounialysis is included) and electrolyses wherein it is useful to limit the passage of water from one compartment of the cell containing the membrane assembly to another compartment. In the cells employed there will normally be present at least three compartments for electrodialysis although in some operations two compartments or sections, one upstream and one downstream of the membrane assembly, may be useful, especially for dialysis. The electrolytic cells may contain two or more compartments, normally containing from two to five compartments and preferably two or three compartments.

The materials of construction of the various cells are known for such purposes and include, as wall and bottom members, various steels, stainless steels, hard rubbers, concretes, polyvinyl chloride, polyvinyl chloride- or polytetrafluoroethylene-coated concrete or similarly coated steels or other base materials, molded polypropylene, bitumen (often useful for cell bottoms), polyethylene, glass, ceramics, fiberglass reinforced polyester and lead. Electrodes may be of any suitable conductive materials compatible with the electrolytes and products of electrodialysis or electrolysis, such as platinum, steel, carbon (graphite or comprssed granules) and noble metal oxide-coated titanium, e.g., ruthenium oxide-coated titanium. Of course, most metals, being good conductors, can be used as electrodes under particular circumstances. The membrane assemblies are set in the cell so as to prevent passage of electrolytes from one compartment to another except through the assemblies. The voltage gradients across the membrane assemblies are about 10% of that needed across an ion exchange resin membrane at the same current density during cell operation, representing a saving of 90% in such energy requirements.

The electrodialytic and electrolytic processes of the invention are applicable to a wide variety of solutions of electrolytes and also to emulsions. Among the various materials that may be treated electrodialytically are pickle liquors (mixtures of $FeSO_4$ and $H_2SO_4$), chromate wastes (solutions containing $CrO_4^=$ and metallic ions such as $Zn^{++}$), dilute chromic acid, steel pickle liquor rinse waters and nickel plating liquors. Representative of useful electrolytic processes which may be employed is the manufacture of chlorine, sodium hydroxide and hydrogen from sodium chloride solution. Exemplary of a mixed electrodialytic-electrolytic process is recovering sulfur, sulfurous acid and bromine from a photographic solution containing thiosulfate and bromide ions.

The electrolytic conditions employed will usually involve the use of a D.C. current at an average potential of about 0.5 to 50 volts, preferably 2 to 10 volts in most instances, with current flow being between about 0.1 to 100 amperes, preferably from 0.5 to 10 amperes, at a current density of about 0.1 to 10, preferably 0.1 to 3 amperes per square centimeter. The materials being treated will normally be aqueous solutions and although both very alkaline and acid pH's may be employed (0.1 to 14), the pH will normally be in the range of 0.5 to 9, preferably 1 to 5 in most cases, excepting, of course, processes for the production of caustic materials. Normally the water content will be in the range from 70 to 99.9% of the electrolyte, preferably 90 to 99.8% thereof. Flow rates through the cell (as distinguished from flow rates through the membrane assemblies) will usually be dependent on the particular type of treatment being effected, the percentage of recycle, the degree of reaction or concentration desired and various other variables. Accordingly, such flow rate limits are not given here.

The following examples illustrate but do not limit the invention. Unless otherwise specified all parts are by weight and all temperatures are in ° C. in the examples and throughout the specification.

EXAMPLE 1

The cell employed is a three-compartment cell of a type like that of FIG. 5, slightly modified. Since the reaction of this example is to be batch the inlet and outlet to the catholyte compartment are closed. The various sections of the cell are of volumes of 200 ml. each and are composed of polymethacrylate (Plexiglas ®)-type plastic having an internal diameter of about 7.6 cm. The electrodes are platinum (stainless steel may be substituted) and the membranes are each of six layers of Grant Wilson commercial grade asbestos paper, each layer being about 0.6 mm. thick. The membranes have pores in the range of 1 to 5 microns equivalent diameter and have openings or voids on the surfaces of about 0.5 or 1 to 2.5 microns equivalent diameter. About 30% of each of the top surfaces of the major faces of the membranes is solid and about 95% thereof is viewable as a solid at a depth of less than 50 microns from such surfaces. At 20° C. and 100 mm. Hg. pressure (gauge) the membrane assembly allows water to pass through it at a rate of about 0.6 ml./hr./sq. cm., each of the individual membrane layers having allowed such passage at a rate of about 30 ml./hr./sq. cm. Perforated nylon discs of an exposed area on one major face thereof of about 6.4 sq. cm. and (having about 86% open spaces therein) are at both ends of the membrane assembly. The individual membrane layers are fastened together at their peripheries, as by gluing and after moistening the surfaces to be "contacting" each other, these are held together by threaded rods and hand-tightened wingnuts pressing against the perforated plastic discs with a force of about 500 g./sq. cm.

Waste photographic fixer solution is delivered to the first (catholyte) compartment of the cell, water is added to the other two components and a potential difference of two volts is applied. After a period of three hours the bromide ion has migrated to the third compartment (containing the anode) and has therein been converted to bromine so that the compartment is of a distinctive deep yellow color due to the presence of the bromine. The thiosulfate, the larger and slower moving ion, is held substantially in the middle compartment, where it decomposes to sulfur and sulfite. Approximately 50% of the bromide and thiosulfate ions charged had entered the second and third compartments. Any slight leakage of water between the compartments, due to minor imperfections in the membranes, is negligible over the time period mentioned.

EXAMPLE 2

The same basic cell as described in Example 1 is employed to concentrate and purify impure dilute sulfuric acid (2.1% $H_2SO_4$) at 40° C., which has been obtained by unialysis of an ammonium sulfate wash water. The cell has an inlet line entering the catholyte compartment and an outlet exiting from the top thereof, as in FIG. 6 and an intermediate voltage is maintained on an additional electrode in the middle or buffer compartment. The membrane assembly has an effective area of about 6.4 sq. cm. An initial potential difference of 46 volts is applied between the cathode and the bipolar electrode and 40 volts are applied across the bipolar electrode and the anode (characterized as $V_{c1}$ and $V_{a1}$ respectively) and during the operation, which lasts 27 hrs., these decrease to 8.0 ($V_{c2}$) and 13.5 ($V_{a2}$) respectively. Corresponding current flows, $I_{c1}$, $I_{a1}$, $I_{c2}$ and $I_{a2}$ are 0.5, 0.3, 1.2 and 2, respectively, resulting in 31.6 and 29.6 ampere-hours consumed, respectively.

During the operation pH measurements indicate that the intermediate compartment, which initially contains water (the dilute sulfuric acid having been charged to the catholyte compartment) has decreased in pH due to acid build-up. At the end of the operation, after about 27 hours, the anolyte compartment is even more acidic and the concentration of sulfuric acid therein is 8.1%. In this example, like Example 1, the average electrolyte temperature is 40° C. The effluent from the catholyte compartment is found to have increased in pH to neutral and sometimes it has a pH as high as 9 or 10, depending on the extent of recycle through that compartment.

In a variation of the above described experiment dilute sulfuric acid containing ammonium sulfate and metal ion impurities (Na, K, $M_g$, Ni) is fed into the middle compartment of the cell (the catholyte compartment inlet line is closed off) and products are continuously removed, after equilibrium has been established, from the anolyte and catholyte compartments. The sulfuric acid removed from the anolyte compartment is at a concentration of about 8% and the effluent from the catholyte compartment, with a pH about neutral, contains a significant proportion of the ammonium and metal ions initially charged to the cell in the feed.

EXAMPLE 3

A pickle liquor (an aqueous solution of $FeSO_4$ and sulfuric acid) is charged to the 180 ml. catholyte compartment of an electrounialytic cell like that of FIG. 7, with the same type of electrodes and membrane assembly being employed as described in the preceding examples and distilled water is charged to the similarly sized anolyte compartment. The inlet and outlet passageways to the catholyte compartment are closed off and the electrodialytic process employed is a batch operation. A potential difference of five volts is applied across the electrodes and the average current flow during the 19 hour batch operation is 1.8 amperes. The sulfuric acid produced in the anolyte after that time is an 11% solution, greatly increased from the approximately 2% acid solution charged. The sulfuric acid made is substantially free of iron and it is noted that the iron plates out on the cathode at low pH's and precipitates out as the hydroxide in the catholyte when the pH is raised above neutral. The current efficiency for the operation is in the range of 27 to 50% on the basis of the sulfate ion transport but, considering the removal of iron from the solution too, the cell efficiency is higher. Further increases in efficiency can be obtained by the use of larger electrodes, corresponding in size to the membrane assembly. During the unialysis the minimum resistance noted is about 2.5 ohms, which is considered to be mostly the resistance of the membrane assembly.

In a variation of this experiment a rinse water obtained after chromate treatment of metal and containing about 135 parts per million of dichromate is subjected to a batch treatment in the described cell. The rinse water treated is that resulting from the application of acidic potassium dichromate in a finishing bath for zinc articles. During the unialysis the $Cr_2O_7^=$ (or $CrO_4^=$) content of the catholyte is diminished to about 35 p.p.m., the pH of the catholyte changes from about 6 to about 9 and some zinc ions are converted to zinc hydroxide.

In another modification of this experiment the starting material charged to the catholyte compartment contains about 5 g./l. of $Cr_2O_7^=$ at a pH of about 1. By application of an average potential difference of five volts, after 20 hours the anolyte, initially distilled water, contains 75 g./l. of the dichromate and the catholyte content is reduced to 0.1 g./l., as $CrO_4^=$, at a pH of 6. The catholyte is repeatedly replaced (16 times) every 1 to 1.5 hours, as it is depleted to the level mentioned during the reaction. In further modifications the concentration in the anolyte compartment is increased by employing three and four compartments to overcome the effect of the concentration gradient in the membrane assembly and by this method the concentration of $Cr_2O_7^=$ and/or $CrO_4^=$ in the catholyte compartment may be diminished even further, e.g., to 0.001 g./l., and one can even reduce the concentration to 0.000 g./l., if desired.

EXAMPLE 4

A metal pickling rinse water having a pH of 7 and a total dissolved solids content of 0.95% is subjected to the treatment described in Example 3, using the apparatus therein employed. After completion of the treatment (about twenty hours) the total dissolved solids content is 0.2% and the pH is 11.9, with the resistance of the solution having increased to 106 ohms from a starting 36 ohms, as measured by a standardized test. The resulting product is then subjected to the same type of unialysis but this time it is charged to the anolyte compartment and cations are removed. After the same period of treatment the pH is 7.8 and the total dissolved solids content is reduced to 0.08%, with the resistance, by the same standard test, increasing to 1,590 ohms.

This experiment proves that the membrane assembly is ion selective due to the opposed electrical field only, allowing transmission of ions through the membrane in either direction, with either positive or negative ions being transmitted depending on the charges of the electrodes used.

EXAMPLE 5

Figure 8:
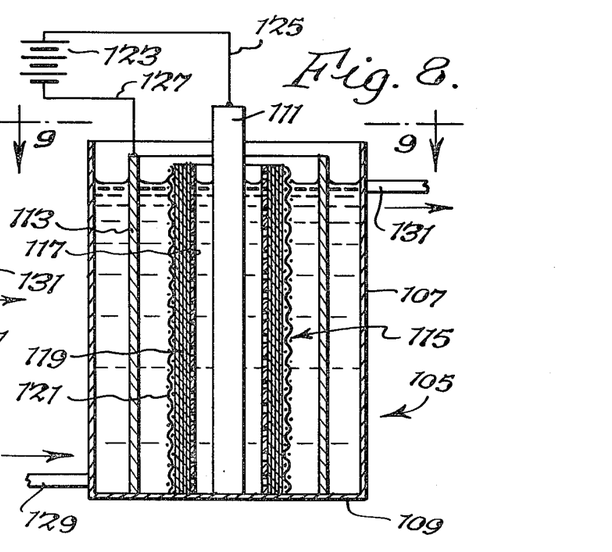
FIG. 8 is a central sectional elevation of an electrolytic-electrodialytic cell of this invention.
Figure 9:
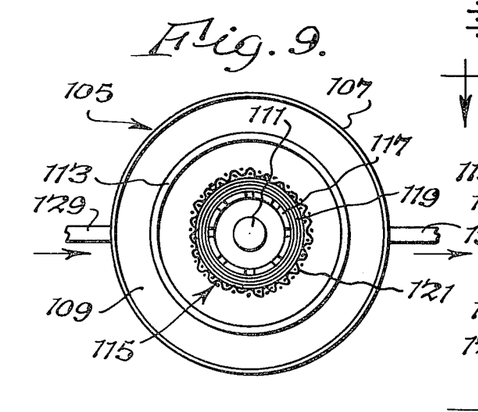
FIG. 9 is a plan view along plane 9—9 of FIG. 8.

A 1% aqueous solution of chromic acid, containing metal ion impurities ($Zn^{++}$, $Ni^{++}$, $Cu^{++}$ and $Na^+$) is purified and concentrated by treatment in a cell of a type illustrated in FIGS. 8 and 9. This cell is a cylinder 19 cm. in diameter and 75 cm. high, with the internal cylinder on which six layers of asbestos paper of the type previously described in these examples are wound, with boundary layers of electrolyte between them, being of a diameter of 10.2 cm. and perforated to contain 50% open area. The layers of asbestos membrane paper are held in place by a tied plastic screen (6 meshes per cm. of 0.25 mm. diameter nylon) which exerts a pressure on the paper of about 50 g./sq. cm., with points of application of such pressure being within every square centimeter of the cylindrical membrane surface. The electrodes employed are of graphite and the tie for the screen is nylon cord.

The cell is run at a potential difference of five volts D.C. and 20 amperes. Flow of solution through the cell is at the rate of 200 ml./min. and the catholyte removed is noticeably lower in chromic acid concentration. The anolyte eventually reaches a concentration of 12% chromic acid and upon recycling of the catholyte its chromic acid content drops to 0.04%.

The described experiment is repeated, using a 1% solution of sodium dichromate, commercial grade, as the catholyte feed. With the same voltage, current, catholyte flow rate and cell conditions the catholyte effluent is reduced in dichromate, the catholyte contains metal hydroxide impurities that precipitate out, notably zinc hydroxide and iron hydroxide, and the anolyte, which initially is distilled water, becomes a 10% chromic acid solution which may be appropriately neutralized to the desired sodium salt by treatment with caustic or may be reused as is.

When the same cells and electrolyte as described previously in this example are set up and allowed to stand without any current flow there is essentially no movement of ions or liquid through the membrane assembly.

EXAMPLE 6

The apparatus of Example 5 is employed to produce chlorine, hydrogen and sodium hydroxide solution from aqueous sodium chloride solution, utilizing a voltage of about four volts and a current density of about 2 amperes/sq. cm. However, the cathode employed is steel and the feed, a 20% solution of sodium chloride, is to the anolyte compartment and is maintained at 20% concentration by recirculation of the anolyte, with make-up feed being added as some of the ions of the anolyte are converted to gas and some are transported to the catholyte compartment through the membrane. The feed to the catholyte is water, as needed, to produce a 15% sodium hydroxide solution. The catholyte inlets and outlets illustrated are employed but in addition an inlet and an outlet for the anolyte near the bottom of the anolyte compartment and the top thereof respectively, are also installed. The process runs smoothly, with chlorine being produced at the anode and being taken off overhead and with hydrogen and aqueous sodium hydroxide being produced in the catholyte compartment, the hydrogen being removed overhead and the sodium hydroxide solution being removed at the desired 15% concentration through the catholyte outlet line. Only sodium ions migrate through the membrane from the anolyte to the catholyte and therefore the sodium hydroxide produced is essentially free of chloride impurity.

In modifications of this experiment the anode is replaced by a ruthenium oxide coated titanium anode and different numbers of layers of membrane material, e.g., 4, 8 and 10, are employed, of different pore sizes, surface openings and thicknesses, all however, within the preferred ranges given for such properties. The reactions proceed equally well, with even less chloride migration in the cases of the greater numbers of membrane layers per membrane assembly and when the membranes are of lower water transmitting characteristics. The membrane assemblies, before use in the apparatus and process of this example, are tested by means of an apparatus like that illustrated in FIG. 10 and it is found that they are satisfactory for commercial electrodialytic and electrolytic uses when the assemblies allow water at 40° C. under a pressure of 100 mm. Hg to pass through at a rate in the range of 0.3 to 1 ml./hr./sq. cm., and the individual membranes thereof all separately allow the water to pass at a rate of 15 to 40 ml./hr./sq. cm.

EXAMPLE 7

The procedure described in Example 2 is repeated but instead of using the described asbestos paper, there are employed six layers of porous polyethylene "membrane" sheets 3 mm. thick and having a pore size of 20 microns; 15 layers of Eaton Dikeman grade 613 filter paper having pores 10 microns in diameter; and four layers of asbestos paper like that previously described but of 1.3 times the thickness. Also, the nylon discs have about 75% open spaces therein and the pressure by which they are held is about 300 g./sq. cm.

The separations described are effected under the new conditions in the manner previously reported. However, the use of the asbestos and polyethylene membranes is preferred in view of the poorer stability of the cellulosic paper membranes under the conditions of the processes. Also, when a lower number, e.g., six, instead of fifteen thicknesses of the cellulosic paper, is used, the rate of water transmission through the cellulosic membrane assembly is sometimes higher than desired.

EXAMPLE 8

The procedures of Examples 3 and 4 are repeated, utilizing the membrane materials described in Example 7 and also using equivalent membranes of porous polyurethanes, porous synthetic rubbers, mineral fibers, ceramics and glasses compatible with the materials being treated and similar purifications and concentrations are obtained. Membrane assemblies of such materials are also ion selective due to the opposed electrical field only, as described in Example 4. Even better separations are obtained by using a 3-compartment cell with membrane assemblies of greater "porosity" nearer to the catholyte or charging compartment and of lesser porosity farther on and away from such compartment (nearer to the anolyte compartment).

EXAMPLE 9

The experiments of Example 5 are repeated using variations of membrane thicknesses, numbers of individual membranes employed per assembly, open areas, surface smoothnesses, porosities, voltages, current flows, current densities, pressures on the membranes, flow rates and times, all within the ranges previously described (preferably being the mid-points of such ranges and quarter points thereof, between the mid-points and the extremes). Also, different porosity membrane materials are used in the membrane assembly. For the processes with compatible membrane materials useful concentrations of the chromic acid are obtained.

In other such experiments, various other dilute acidic, neutral and alkaline materials, e.g., acetic acid, potassium nitrate and sodium carbonate are also concentrated and purified.

EXAMPLE 10

The slowing of diffusion of electrolyte, both liquid medium and ions therein, through a membrane assembly of this invention, compared to flow through a single layer of membrane material, is shown by this experiment. A two-compartment cell, like that of FIG. 7 but without an electric potential difference being applied across the electrodes, is utilized. The membrane assembly is made of six layers of the asbestos paper previously described which are held together with a plurality of boundary layers of water between them by means of a pair of perforated discs like those previously described, under the described pressure. The membranes are of about 15 sq. cm. in area (one face) and the perforations of the discs constitute about 75% of the major face areas thereof.

In one compartment there is filled a 1,500 p.p.m. $CrO_3$ aqueous solution and in the other tap water is initially present. There is no head difference between the two compartments and the only force for diffusion is osmotic, proportional to the concentration difference between the liquids in the compartments. Changes in concentrations are followed spectrophotometrically. After three days, transmission of 475 millimicron wave length light is 96.8%, compared to 100% initially and after 21 days the light transmission is still 68.2%. With the single membrane employed light transmission of the water side solution is 96.9% after three hours and is 57.5% after 21.5 hours. Thus, the migration by osmotic diffusion is slowed by the invented membrane assembly by a factor of 4 to 20 times that expected based on the total thickness of the assembled membranes.

When a potential difference is impressed across the electrodes, as in Example 3, with the anode being on the water side, the hexavalent chromium ion readily penetrates the membrane assembly but the solvent does not penetrate it to any greater extent than reported above. During shutdown of the cell a small counterpotential impressed across the electrodes prevents diffusion of hexavalent chromium into the water or anolyte compartment. For the 6-membrane assembly described above the diffusion rate can be lowered to as little as one p.p.m./hr. of $CrO_4^=$.

From this and other experiments it is apparent that following the method of this invention ion removal by unialysis or dialysis cells is independent of concentration and by utilizing best cell designs commercial concentrations may be prepared of ions removed from dilute solutions. This is unlike various prior art methods wherein only low concentrations of such ions are usually obtainable.

Another advantage of the present invention is that when the cells are being operated with an electric potential difference being applied across the electrodes thereof the membrane will be conductive only as long as ions are being transported through it and therefore, when depletion of an ionic material in one compartment (and in the membrane assembly) is completed the total cell resistance will increase, leading to low or negligible current flow and a saving in the cost of electricity. Thus, the present cells are self-controlling and economical.

The membrane assemblies of this invention, with boundary layers of liquid held between thin layers of smooth surface membrane materials, are superior to various membranes presently employed because they permit ion migration in either direction therethrough, dependent only on the polarities of the potential differences applied, are of comparatively low electrical resistance, prevent undesired water migrations and are easily manufactured, installed and serviced. By holding together the comparatively thin membrane layers, with liquid between them, one is able to make a useful commercial membrane of much lesser thickness than would be required were the same material to be employed as a single membrane, without intervening boundary layers. Such a saving of membrane material allows the membrane assembly part of the cell to be of a much lesser thickness, a lower resistance and a better ion-passing property and also reduces the cost of the cell and its operation. Therefore the present membranes represent significant advances over previously favored anion-active or cation-active membranes, which may swell objectionably during use, as sites thereon are filled with ions that enter the membranes but do not pass through them.

The invention has been described with respect to specific embodiments and illustrations thereof but is not to be limited to these because it is evident that one of skill in the art with the present specification before him will be able to utilize substitutes and equivalents without departing from the spirit of the invention and without going beyond the scopes of the claims.

What is claimed is:

1. A method for lessening diffusion of ions from an aqueous medium of a higher concentration of such ions to another aqueous medium of a lower or zero concentration of such ions which comprises separating such media with a membrane assembly with which the media are in contact and through which ions thereof may be transmitted electrolytically, which membrane assembly includes a plurality of layers of membrane material having adjacent major surfaces thereof with boundary layers of liquid between such surfaces and with the membranes being held together to maintain such boundary layers over the areas between such surfaces.

2. A method according to claim 1 wherein the membrane assembly is useful for electrodialysis and electrolysis, wherein the single membranes thereof pass at least 1 ml./hr./sq. cm. of water at 20° C. and 100 mm. mercury pressure, the adjacent major surfaces of the membranes are smooth, of a pore size of 0.01 to 250 microns in diameter and with surface voids of 0.01 to 125 microns in diameter, the layers of membrane material are from 0.1 to 3 mm. thick, the medium is liquid and is in film form between the membranes and is of a mean thickness of up to 300 microns, from 4 to 10 membrane layers are aligned and held together in readily separable relationship and a holding force is applied thereto over the surfaces of external membrane layers.

3. A method according to claim 2 wherein the membranes are all of the same material and are flat, 10 to 90% of the nominal adjacent major surface areas thereof is solid and at least 90% of such areas is solid at a depth within 120 microns of the surface, the layers of membrane material are from 0.2 to 2 mm. thick, the membrane is of a material selected from the group consisting of mineral fibers, paper, synthetic organic polymers, ceramics and glasses, the aqueous liquid is conductive of electricity and the holding force is applied to the membranes by means of an openwork force-transmitting member and corresponds to a pressure of 12 g./sq. cm. to 5 kg./sq. cm.

4. A method according to claim 3 wherein the membranes are of 4 to 6 layers of asbestos paper, each layer being about 0.6 mm. thick, the aqueous liquid is an electrolyte and at 20° C. the assembly passes water therethrough at a rate not more than $\frac{1}{4}$ the rate for a single layer divided by the number of layers in the membrane assembly.

5. A method according to claim 1 wherein the membranes are of a plurality of layers of asbestos paper held together with a plurality of boundary layers of water between surfaces thereof, one of the aqueous media contains a substantially higher concentration of ions than the other aqueous medium, there is little or no head difference between the two media and the migration of ions through the membrane assembly is slowed substantially more than calculatable on the basis of the total thickness of the assembled membranes and the diffusion rate through a single membrane.

6. A method according to claim 5 wherein the membrane assembly is also useful for electrodialysis and electrolysis and in which assembly the single membranes thereof pass at least 1 ml./hr./sq. cm. of water at 20° C. and 100 mm. mercury pressure, the adjacent major surfaces of the membranes are smooth, of a pore size of 0.01 to 250 microns in diameter and with surface voids of 0.01 to 125 microns in diameter, the layers of membrane material are from 0.1 to 3 mm. thick, the medium is liquid and is in film form between the membranes and is of a mean thickness of up to 300 microns, from 4 to 10 membrane layers are aligned and held together in readily separable relationship and a holding force is applied thereto over the surfaces of the external membrane layers to maintain the boundary layers of aqueous medium therebetween.

7. A method according to claim 6 wherein the membranes are all of the same material and are flat, 10 to 90% of the nominal adjacent major surfaces areas thereof is solid and at least 90% of the area is solid at a depth within 120 microns of the surface, the layers of membrane material are from 0.2 to 2 mm. thick, the aqueous liquid is conductive of electricity and the holding force is applied to the membranes by means of an openwork force-transmitting member and corresponds to a pressure of 12 g./sq. cm. to 5 kg./sq. cm.

8. A method according to claim 7 wherein the membranes are of 4 to 6 layers of asbestos paper, each layer being about 0.6 mm. thick, the aqueous liquid is an electrolyte and at 20° C. the assembly passes water therethrough at a rate not more than $\frac{1}{4}$ the rate for a single layer divided by the number of layers in the membrane assembly.

9. A method according to claim 8 wherein the membrane assembly is made up of six layers of the asbestos paper held together with a plurality of boundary layers of water between them by means of a pair of perforated discs under pressure, with perforations of the discs constituting about 75% of the major face areas thereof, one aqueous medium is an aqueous chromic acid solution and the other is water, there is no head difference between the media and the osmotic diffusion rate is slowed by a factor of four to twenty times that calculatable based on the total thickness of the assembled membranes.

10. A method according to claim 8 where diffusion of hexavalent chromium ion into the water medium is lowered to about 1 p.p.m./hr. of $CrO_4^=$ by application of a small electrical counterpotential across the membrane assembly.

11. A membrane assembly which comprises a plurality of layers of membrane material having adjacent major surfaces with boundary layers of liquid between such surfaces and with the membranes being held together to maintain such boundary layers over the areas of such surfaces.

12. An electrodialytic apparatus comprising at least three compartments, including an anode compartment, a cathode compartment and an intermediate compartment and membrane members separating the intermediate compartment from the anode and cathode compartments, at least one of which members is a membrane assembly of the structure described in claim 1.

13. An electrolytic cell comprising anode and cathode compartments with at least one membrane assembly of the structure described in claim 1 between them.

14. A method for electrodialyzing an electrolyte which comprises subjecting such electrolyte in an electrodialysis cell of the structure described in claim 12 to an electrodialyzing voltage difference between electrodes of such cell and recovering a component of the electrolyte charged.

15. A method for electrolyzing an electrolyte which comprises subjecting such electrolyte in an electrolytic cell of the structure described in claim 13 to an electrolyzing voltage drop between electrodes of such cell and recovering a product of electrolysis.

* * * * *